Sept. 16, 1947.  G. E. DUNN  2,427,449

UNIVERSAL JOINT

Filed June 23, 1944

INVENTOR.
George E. Dunn.
BY
Harness, Dickey & Pierce
ATTORNEYS.

Patented Sept. 16, 1947

2,427,449

UNITED STATES PATENT OFFICE 2,427,449

UNIVERSAL JOINT

George E. Dunn, Dearborn, Mich., assignor to Universal Products Company, Inc., Dearborn, Mich., a corporation of Delaware Application June 23, 1944, Serial No. 541,755

10 Claims. (Cl. 64—17)

The invention relates to universal joints and it has particular relation to the bearing cups normally provided on the trunnions of the joint.

In universal joints where a cross is used, each trunnion on the cross projects into a bearing cup usually held in a yoke arm on one of the shafts. Needle bearings ordinarily are employed within the cup and around the trunnion and the edge of the cup seats against a seal so as to prevent lubricant from escaping and water or dirt from entering the cup. In many instances, the manufacturer of the universal joint supplies the cross, bearing cups thereon, and one shaft with its yoke connected to two of the bearing cups. When this assembly is supplied, it is desirable to use some means to hold the other two bearing cups on their trunnions until they are connected to the other yoke by the automobile manufacturer for the reason that the proper amount of lubricant is placed therein during assembly of the cups and trunnions and if any one cup should accidentally or otherwise be removed thereafter, some of the lubricant may escape or dirt may enter the cup.

One type of cup retainer used for this purpose comprises a tie element which extends diametrically of the cross and embraces both bearing cups and when it is necessary to assemble the cross with the second yoke arm, this tie element is removed. However, when this type of holding means is employed, a bearing cup occasionally becomes displaced from its trunnion after the tie element is removed and before the cross is assembled with the second yoke. Furthermore, the tie element does not always hold the bearing cup tightly enough in position so as to prevent escape of lubricant and as a result bearing cups in the assembled joint have less lubricant than initially intended.

One object of the present invention is to provide an improved retaining means for holding a bearing cup in position on its trunnion so as to prevent the escape of lubricant and entrance of dirt or the like.

Another object of the invention is to provide an improved cup retaining means for the purposes indicated, which is a permanent part of the universal joint so that it is unnecessary to remove it, from which it follows that there is no danger of the cup becoming displaced from the trunnion once it is placed in position by the joint manufacturer.

Another object of the invention is to provide an improved cup retaining means which is internally of the cup and so designed that it will not interfere with operation of the joint.

Another object of the invention is to provide an improved cup retainer which automatically acts to hold the cup in place once the latter has been placed on the trunnion.

Other objects of the invention will become apparent from the following description, from the drawings to which it relates and from the claims hereinafter set forth.

For a better understanding of the invention reference may be had to the accompanying drawings wherein.

Figure 1:
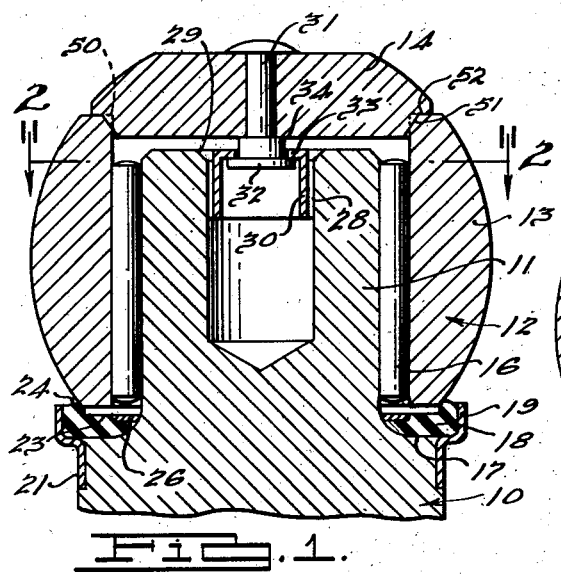
Figure 1 is a cross-sectional view of one trunnion on a universal joint having a bearing cup thereon held in place according to one form of the invention.
Figure 2:
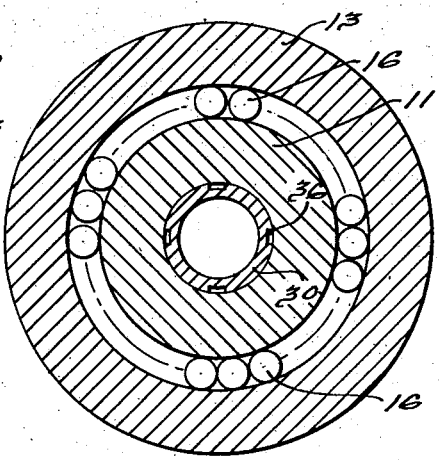
Figure 2 is a cross-sectional view taken substantially along the line 2—2 of Figure 1.

Referring to Figure 1, a cross forming part of a universal joint having four trunnions is indicated at 10 and one trunnion thereof is indicated at 11. This trunnion projects outwardly into a spherical bearing cup 12 which comprises two parts 13 and 14 welded together as will be presently described. Needle bearings 16 are provided between the trunnion and side wall of the cup in the usual manner.

At the base of the trunnion 11, an annular shoulder 17 is provided and a rubber sealing ring 18 provided on this shoulder is retained by an annular ferrule 19 which has a sleeve portion 21 press fitted on the shoulder. The sealing ring 18 is composed of oil resisting rubber such as synthetic rubber designed for this purpose, and the particular ring shown has a substantially flat portion 23 adapted to engage the end face of the part 13 of the cup and an annular rim portion 24 adapted to contact the spherical surface of the part 13 adjacent its end. A hard metal washer 26 is provided in the sealing ring 23 for engagement with the ends of the bearings 16 so as to prevent the latter from injuring the rubber.

The trunnion 11 has an opening 28 centrally thereof flared at its outer end, as indicated at 29, and this opening provides a reservoir for lubricant. When the bearing cup is placed on the trunnion, enough lubricant is placed therein so as to desirably lubricate the needles and provide a store of lubricant and the latter is prevented from escaping by engagement between the end of the portion 13 of the cup and the rubber sealing ring. When the cup is in proper position on the universal joint, the outer or base portion 14 of the cup is substantially against the end face of the trunnion and the inner end of the side wall part 13 is pressed against the flat portion 23 of the sealing ring and the spherical surface is pressed against the rim portion 24.

For retaining the cup in place of the trunnion prior to assembly with the yoke arm, a tubular sleeve element 30 is fastened to the inner side of the base 14 and the means for connecting the sleeve to the base comprises a rivet element 31 extending through the base and having a flanged head 32 on its inner end which overlaps an annular rim 33 on the outer end of the sleeve. This rivet element has a smaller spacing portion 34 between the base 14 and the flange 32 which fits loosely in the opening in flange 33 so as to permit substantial play or loose movement of the sleeve element 30 both axially and radially relative to the rivet element 31 and the cup. In other words, the element 30 is free to move longitudinally and radially of the trunnion within limits provided by the flange 32 and the base 14 and the radial clearance between flange 33 and rivet portion 34. It will be noted that the outer surface of the sleeve 30 has a plurality of axially directed slots or grooves 36, and these are provided so that lubricant can flow past the sleeve. The remaining surface of the sleeve has a desired press fit with the inner surface of the trunnion opening 28.

When the cup, with needles therein, is pressed onto the trunnion, the sleeve element 30 is forced into the opening 28 by pressure of the base 14 against the flange 33 on the sleeve and the latter is pressed into the position shown. This inward movement of the cup practically moves the inner end of the cup wall 13 against the flat portion 23 of the sealing ring and at the same time the spherical surface on the cups deforming the corner edge of the rim 24 of the sealing ring. The parts are so designed and arranged that after the cup has been moved inwardly to position the sleeve 30, the cup can not reversely move sufficiently to separate the cup from the sealing flange 24, and therefore once the cup is in place, it remains sealed by contact with the sealing ring. Therefore, it should be understood that with the parts in position as shown by Figure 1, the spherical surface on the cup is still engaged with the corner portion of the rubber rim 24, while at the same time outward movement of the cup is prevented by the rim 33 on sleeve 30 engaging the head flange 32 on the rivet.

Lubricant now can not escape and dirt can not enter the bearing, while at the same time the cup can not be removed by any usual manual effort. The press fit between the sleeve and opening 30 is such as to prevent any displacement or removal by any manual pull and threfore the cup is positively held in place during manual manipulation or handling.

When the cups on the cross are assembled with a yoke, they are forced inwardly until substantially in contact with the end of the trunnion and this causes the desired engagement between the cup and sealing ring. As so positioned, the sleeve 30 does not interfere in any way with the operation of the joint because of the permitted play between the cup and sleeve. The sleeve 30 will always prevent removal of the cup except when considerable pressure is exerted by means of a suitable tool.

Figure 3:
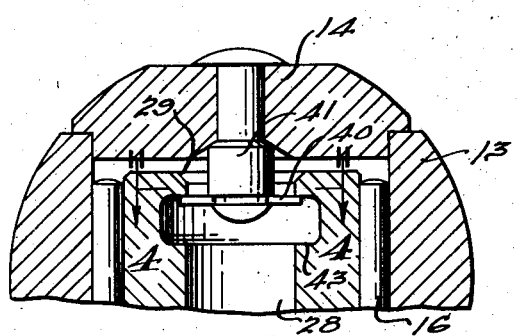
Figure 3 is a fragmentary view on the order of Figure 1 illustrating another form of the invention.
Figure 4:
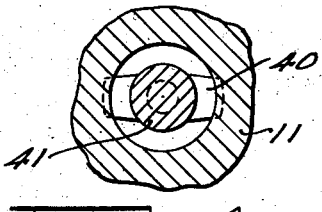
Figure 4 is a cross-sectional view taken substantially along the line 4—4 of Figure 3.
Figure 6:
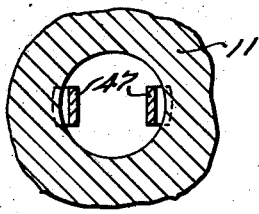
Figure 6 is a cross-sectional view taken substantially along the line 6—6 of Figure 5.

In the arrangement shown by Figure 3, the retaining means comprises a spring element 40 secured to a rivet 41 which extends through the base 14. This spring element has ends which project outwardly into an annular recess 43 provided in the bore 28 of the trunnion. When the cup is pressed over the trunnion, the ends of the spring element 40 bend sufficiently to allow it to enter the bore and into the annular portion 43 and then the ends of the spring element straighten out and prevent ordinary removal of the cup. The parts are so arranged in this case also that there is no interference with the joint operation and at the same time the cup can not move outwardly sufficiently to break the rubber seal completely.

Figure 5:
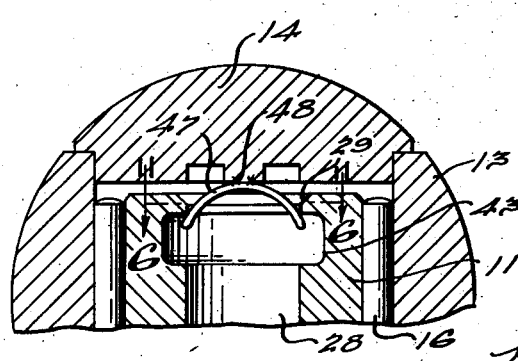
Figure 5 is a fragmentary cross-sectional view also on the order of Figure 1 illustrating another form of the invention.

In the form of the invention shown by Figure 5, a spring element 47 is welded to the base 14 of the cup as indicated at 48. The ends of this element cooperate with the annular portion 43 of the opening in the trunnion substantially in the same way as the ends of the spring element in Figure 3.

It was mentioned previously that the two parts of the cup in Figure 1 are welded together. Initially, the outer end of the part 13 has a sharp corner portion 50 which during welding is pressed against a taper 51 on the base 14. Welding occurs along this engagement and as welding occurs the metal flows or upsets until finally in the finished weld, the parts are welded substantially along the taper 51. The operation of moving the parts together continues until the outer end of the part 13 contacts an annular overhanging shoulder 52 and when this occurs, the spherical surfaces on both parts are concentric. During welding, suitable holding devices will be used to maintain the part 14 concentric to the axis of the part 13 or the parts may be welded together to form an approximate sphere and then the outer surface may be ground to obtain the desired spherical accuracy. The cups in Figures 3 and 5 may also be constructed of separate parts welded together as described in connection with Figure 1 or the parts may be press fitted together.

Although more than one form of the invention has been illustrated and described in detail, it will be apparent to those skilled in the art that various modifications may be made without departing from the scope of the appended claims.

What is claimed is:

1. In a universal joint, a trunnion having an opening in its end, a cup shape bearing element into which the trunnion projects, and resilient means fastened to the inner side of the cup base and automatically engageable with the wall of the opening in the trunnion when the cup is placed on the latter for holding the cup on the trunnion.

2. In a universal joint, a trunnion element, a cup shape bearing element into which the trunnion element projects, and engageable means on the inner side of the cup base and on the trunnion element for retaining the cup element on the trunnion element, said means comprising an opening in one element and a spring element on the other adapted to enter into and engage the wall of the opening.

3. In a universal joint, a trunnion element, a cup shape bearing element into which the trunnion element projects, and engageable means on the inner side of the cup base and on the trunnion element for retaining the cup element on the trunnion element, said means comprising an opening in one element and a projection on the other adapted to enter and engage the wall of the opening, the projection being connected to its element by a play permitting connection so as to permit limited axial movement of the cup on the trunnion while still holding it against removal.

4. A bearing cup for a universal joint having a trunnion with an opening in its end said cup having a side wall and base, an element on the inner side of the cup base adapted to enter the opening in the trunnion to hold the cup thereon, and means connecting the element to the base of the cup so as to permit limited movement of the element axially of the cup.

5. A bearing cup for a universal joint having a trunnion with an opening in its end, a spring element on the inner side of the cup base adapted to enter the opening in the trunnion to hold the cup thereon, and means fastening the spring element to the cup.

6. A bearing cup for a universal joint having a trunnion with an opening in its end, a sleeve element on the inner side of the cup and adapted to enter the opening in the trunnion to hold the cup thereon, and means connecting the sleeve to the cup base while permitting limited movement of the sleeve axially of the cup.

7. A bearing cup for a universal joint having a trunnion with an opening in its end, an element on the inner side of the cup base adapted to enter the opening in the trunnion to hold the cup thereon, and means connecting the element to the base of the cup so as to permit limited movement of the element axially of the cup, and radially of the cup.

8. In a universal joint, a trunnion, a cup shape bearing element into which the trunnion projects, and means for holding the cup against removal from the trunnion prior to complete assembly of the joint, said means including interengageable parts on the cup and trunnion which are out of contact when the base of the cup is substantially in contact with the end face of the trunnion and which are brought into contact when the cup is moved outwardly a slight amount, whereby during operation of the joint the holding parts are out of contact, while prior to complete assembly of the joint they act to hold the cup on the trunnion.

9. In a universal joint, a trunnion having an axial opening, a cup shape bearing element into which the trunnion projects, and means for holding the cup against removal from the trunnion prior to complete assembly of the joint, said means including a part fixedly connected to the base of the cup and a second part loosely connected to the first part and adapted to be bindingly pressed into the opening in the trunnion, said parts being out of contact when the base of the cup is substantially in contact with the end face of the trunnion.

10. In a universal joint, a trunnion having an axial opening, a cup shape bearing element into which the trunnion projects and means for holding the cup against removal from the trunnion prior to complete assembly of the joint, said means including a spring part connected to the base of the trunnion and a shoulder in the opening over which the spring part must be sprung when the cup is applied, the spring part being out of engagement with the opening and shoulder when the base of the cup is substantially in contact with the end face of the trunnion.

GEORGE E. DUNN.

REFERENCES CITED

The following references are of record in the file of this patent:

UNITED STATES PATENTS

| Number | Name | Date |
|---|---|---|
| 871,271 | Hall | Nov. 19, 1907 |
| 1,162,703 | Loew | Nov. 30, 1915 |
| 2,124,803 | Wollner | July 26, 1938 |
| 2,228,715 | Wollner | Jan. 14, 1941 |
| 2,338,169 | Dunn | Jan. 4, 1944 |

FOREIGN PATENTS

| Number | Country | Date |
|---|---|---|
| 219,828 | Great Britain | Aug. 7, 1924 |
| 709,142 | France | May 11, 1931 |